(12) United States Patent
Gauthier et al.

(10) Patent No.: US 6,749,335 B2
(45) Date of Patent: Jun. 15, 2004

(54) ADJUSTMENT AND CALIBRATION SYSTEM FOR POST-FABRICATION TREATMENT OF ON-CHIP TEMPERATURE SENSOR

(75) Inventors: Claude Gauthier, Fremont, CA (US);
Brian Amick, Austin, TX (US);
Spencer Gold, Pepperell, MA (US);
Pradeep Trivedi, Sunnyvale, CA (US);
Lynn Ooi, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 20 days.

(21) Appl. No.: 10/147,937

(22) Filed: May 17, 2002

(65) Prior Publication Data

US 2003/0214998 A1 Nov. 20, 2003

(51) Int. Cl.[7] .................. G01K 15/00; G01K 7/14; H01L 35/00
(52) U.S. Cl. .................. 374/172; 374/1; 327/513; 702/99
(58) Field of Search .............. 327/512, 513, 327/83, 362, 378, 540; 374/1, 141, 163, 170–171, 172; 702/99, 86

(56) References Cited

U.S. PATENT DOCUMENTS

| 3,924,470 | A | * | 12/1975 | Sander .................. 73/362 AR |
| 4,165,642 | A | * | 8/1979 | Lipp ..................... 73/362 SC |
| 4,210,024 | A | * | 7/1980 | Ishiwatari et al. ........ 73/362.5 |
| 4,448,549 | A | * | 5/1984 | Hashimoto et al. ........ 374/170 |
| 4,559,954 | A | * | 12/1985 | Murase ...................... 128/736 |
| 5,064,296 | A | * | 11/1991 | Huijsing et al. ............ 374/163 |
| 5,097,198 | A | * | 3/1992 | Holmdahl .................. 323/280 |
| 5,241,286 | A | * | 8/1993 | Mirow .................... 331/108 B |
| 5,268,601 | A | * | 12/1993 | Cossins ...................... 307/491 |
| 5,626,425 | A | * | 5/1997 | Fujikawa et al. ........... 374/163 |
| 5,638,418 | A | * | 6/1997 | Douglass et al. ............. 377/25 |
| 5,639,163 | A | * | 6/1997 | Davidson et al. ........... 374/178 |
| 5,764,067 | A | * | 6/1998 | Rastegar .................... 324/725 |
| 5,838,578 | A | * | 11/1998 | Pippin ........................ 364/488 |
| 5,949,225 | A | * | 9/1999 | Sawtell ....................... 323/284 |
| 6,157,244 | A | * | 12/2000 | Lee et al. ................... 327/539 |
| 6,377,110 | B1 | * | 4/2002 | Cooper ....................... 327/513 |
| 6,559,722 | B1 | * | 5/2003 | Lopez et al. ................ 330/296 |
| 2002/0146993 | A1 | * | 10/2002 | Persico et al. ............. 455/126 |
| 2002/0181543 | A1 | * | 12/2002 | Yin ............................. 374/170 |
| 2003/0107430 | A1 | * | 6/2003 | Casper ....................... 327/540 |

OTHER PUBLICATIONS

"Low–Jitter Process–Independent DLL and PLL Based on Self–Biased Techniques," by John G. Maneatis, IEEE Journal of Solid–State Circuits, vol. 31, No. 11, Nov. 1996 (10 pages).

* cited by examiner

*Primary Examiner*—Gail Verbitsky
(74) *Attorney, Agent, or Firm*—Osha Novak & May L.L.P.

(57) ABSTRACT

An adjustment and calibration system for post-fabrication treatment of an on-chip temperature sensor is provided. As explained in detail below, the adjustment and calibration system includes at least one adjustment circuit, to which the on-chip temperature sensor is responsive, and a storage device that selectively stores control information (1) associated with a state of the adjustment circuit and/or (2) from a tester that writes such control information to the storage device, where the control information stored in the storage device is subsequently selectively read out in order to adjust the adjustment circuit to a state corresponding to the control information.

18 Claims, 8 Drawing Sheets

ADJUSTMENT AND CALIBRATION SYSTEM FOR POST-FABRICATION TREATMENT OF ON-CHIP TEMPERATURE SENSOR

BACKGROUND OF INVENTION

Figure 1:
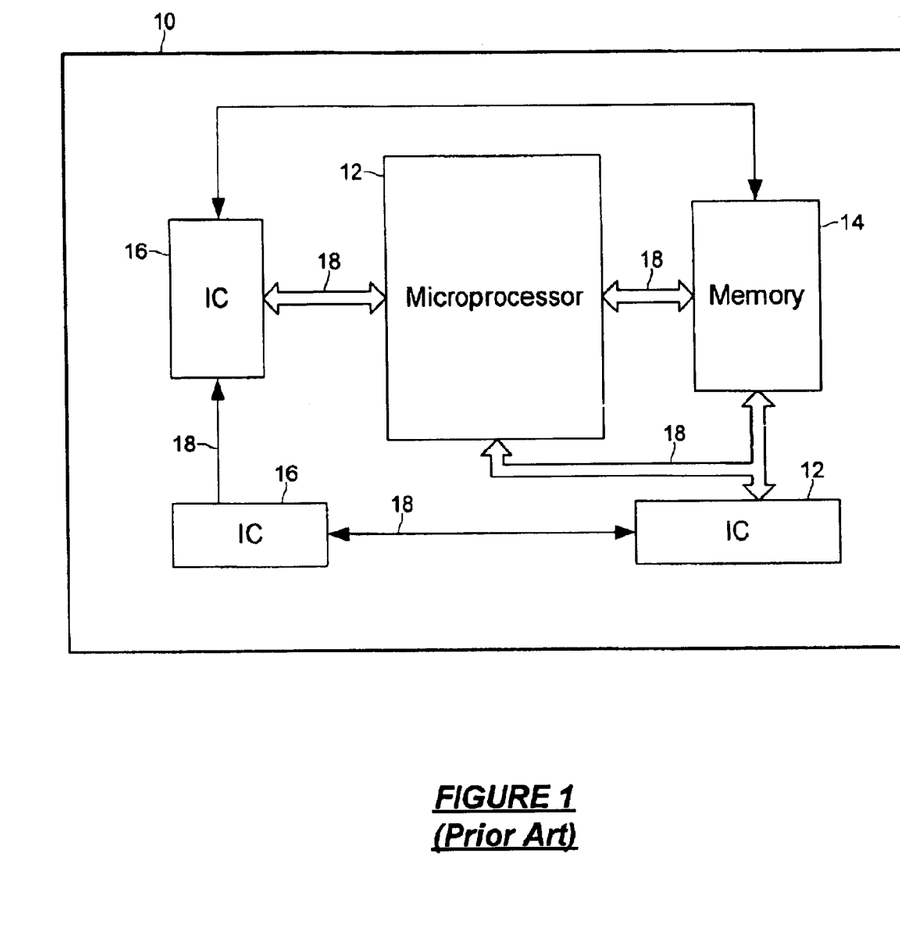
FIG. 1 shows a typical computer system.

As shown in FIG. 1, a typical computer system 10 includes at least a microprocessor 12 and some form of memory 14. The microprocessor 12 has, among other components, arithmetic, logic, and control circuitry that interpret and execute instructions necessary for the operation and use of the computer system 10. Specifically, FIG. 1 shows the computer system 10 having the microprocessor 12, memory 14, integrated circuits (ICs) 16 that have various functionalities, and communication paths 18, i.e., buses and wires, that are necessary for the transfer of data among the aforementioned components of the computer system 10.

As integrated circuit elements continue to get smaller and as more circuit elements are packaged into an integrated circuit, integrated circuits dissipate increased amounts of power, which in turn leads to increased operating temperatures. Increased operating temperatures are generally undesirable because increased temperatures increase the likelihood for performance degradation. Thus, it is becoming increasingly important to know the temperature parameters in which a particular integrated circuit, or portion thereof, operates.

The temperature in a microprocessor is typically measured by generating a voltage proportional to temperature. Such a voltage is referred to as a "temperature-dependent voltage." In many cases, it is also useful to generate a "temperature-independent voltage," i.e., a temperature-insensitive voltage measurement, that may be processed along with the temperature-dependent voltage to allow for cancellation of process and power supply variations. One technique for generating a temperature-independent voltage and a temperature-dependent voltage involves the use of a circuit known in the art as a "temperature-independent and temperature-dependent voltage generator" ("TIDVG"). A TIDVG generates (1) a temperature-dependent voltage representative of a temperature at a point on an integrated circuit on which the TIDVG resides and (2) a temperature-independent voltage that is used to cancel out process and power supply variations inherent in the temperature-dependent voltage measurement.

SUMMARY OF INVENTION

According to one aspect of the present invention, an integrated circuit comprises: a power supply, a temperature sensor, operatively connected to the power supply, where the temperature sensor includes an amplifier stage adapted to output an internal control signal, a startup stage operatively connected to the amplifier stage, where the startup stage is adapted to selectively control the internal control signal, and an output stage adapted to output a temperature-independent voltage and a temperature-dependent voltage dependent on the internal control signal; an adjustment circuit of which an output is operatively connected to the amplifier stage, where the internal control signal is responsive to the adjustment circuit; and a storing device adapted to store control information to which the adjustment circuit is selectively responsive.

According to another aspect, an integrated circuit comprises: amplifier means for generating an internal control signal for a temperature sensor; first generating means for generating a temperature-dependent voltage dependent on the internal control signal; second generating means for generating a temperature-independent voltage dependent on the internal signal; adjusting means for adjusting the internal control signal, where the adjusting means is operatively connected to the amplifier means; and storing means for storing control information to which the adjusting means is selectively responsive.

According to another aspect, a method for post-fabrication treatment of an on-chip temperature sensor comprises: generating an internal control signal using an amplifier stage; generating a temperature-independent voltage depending on the internal control signal; generating a temperature-dependent voltage depending on the internal control signal; selectively adjusting the internal control signal using an adjustment circuit of which an output is operatively connected to the amplifier stage; and storing at least a portion of control information determined from the selectively adjusting in a storage device, where the adjustment circuit is selectively responsive to the at least a portion of the control information.

Other aspects and advantages of the invention will be apparent from the following description and the appended claims.

BRIEF DESCRIPTION OF DRAWINGS

FIG. 4b shows a timing diagram for the storage device shown in FIG. 4a.

DETAILED DESCRIPTION

Embodiments of the present invention relate to an adjustment and calibration system for post-fabrication treatment of an on-chip temperature sensor. As explained in detail below, the adjustment and calibration system includes at least one adjustment circuit, to which the on-chip temperature sensor is responsive, and a storage device that selectively stores control information (1) associated with a state of the adjustment circuit and/or (2) from a tester that writes such control information to the storage device, where the control information stored in the storage device is subsequently selectively read out in order to adjust the adjustment circuit to a state corresponding to the control information.

Figure 2:
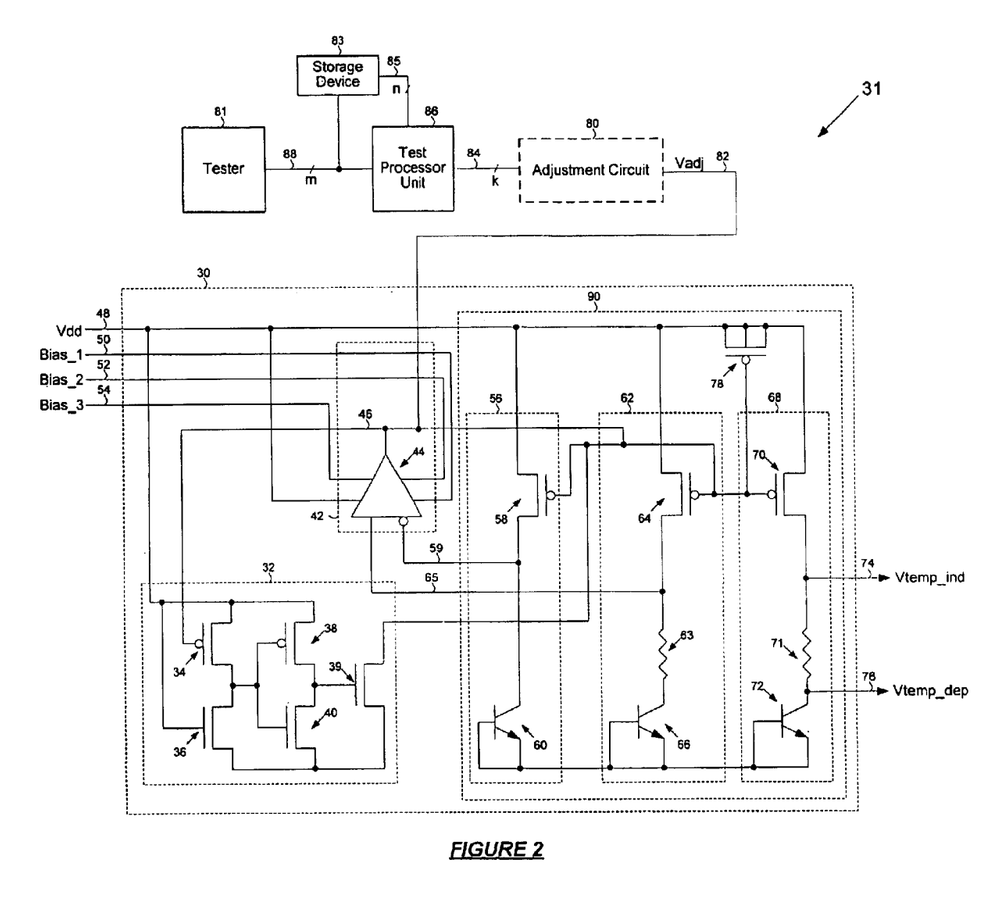
FIG. 2 shows an on-chip temperature sensor adjustment and calibration system in accordance with an embodiment of the present invention.

FIG. 2 shows an exemplary on-chip temperature sensor 30 post-fabrication adjustment and calibration system 31 in accordance with an embodiment of the present invention. In a general sense, the temperature sensor 30 includes a startup stage 32, an amplifier stage 42, and an output stage 90. The output stage 90 functions as a voltage generator and the startup and amplifier stages 32 and 34 function as support circuitry for the output stage 90. In addition to the circuitry in the aforementioned stages of the temperature sensor 30, the temperature sensor 30 is operatively connected to a power supply Vdd 48. Moreover, the temperature sensor 30 outputs a temperature-independent voltage Vtemp_ind 74 and a temperature-dependent voltage Vtemp_dep 76.

The startup stage 32 includes (1) a first inverter formed by transistors 34 and 36, (2) a second inverter operatively connected to an output of the first inverter, where the second inverter is formed by transistors 38 and 40, and (3) a transistor 39 operatively connected to an output of the second inverter. A non-gate terminal of transistor 39 serves as an output of the startup stage 32 and an input to the output stage 90.

The startup stage 32 operates to ensure that the output stage 90 functions correctly. The output stage 90 of the temperature sensor 90 has two stable operating states: (1) a state in which there is a stable current flow; and (2) a state in which there is no current flow, i.e., a no-current state. The startup stage 32 ensures that the output stage 90 remains in the former state, i.e., the state in which current flow is stable, by being responsive to an internal control signal 46 such that the internal control signal 46 does not cause the output stage 90 to remain in a no-current flow state. When the startup stage 32 senses that the internal control signal 46 is causing or may cause the output stage 90 to enter a no-current flow state, transistors 34 and 36 temporarily act to drive an input to the output stage 90 out of the no-current flow state. Specifically, if the internal control signal 46 goes above a particular threshold, transistor 36 causes the first inverter to output low, where after transistor 38 causes the second inverter to output high to transistor 39, which, in turn, drives the output of the startup stage 32 and the input to the output stage 90 low. By driving the input to the output stage 90 to a particular value, the startup stage 32 ensures that the temperature sensor 30 outputs a valid temperature-independent voltage Vtemp_ind 74 and a valid temperature-dependent voltage Vtemp_dep 76.

The amplifier stage 42 of the temperature sensor 30 includes an operational amplifier 44. The operational amplifier 44 is responsive to Vdd 48 and internal bias signals BIAS_1 50, BIAS_2 52, and BIAS_3 54. Inputs to the operational amplifier 44 include a first branch voltage 59 from the output stage 90 and a second branch voltage 65 also from the output stage 90. The operational amplifier 44 operates to correct any error in voltage between the first and second branch voltages 59 and 65. In other words, the operational amplifier 44 seeks to make the difference in voltage between the first and second branch voltages 59 and 65 equal to zero and outputs an error-connected voltage as the internal control signal 46.

The output stage 90 includes (1) a first branch 56, (2) a second branch 62, and (3) a third branch 68. The first, second, and third branches 56, 62, and 68 each include a metal-oxide semiconductor transistor 58, 64, and 70 and a bipolar transistor 60, 66, and 72. The second branch 62 includes a resistor 63, and the third branch 68 includes a resistor 71 and a transistor-formed decoupling capacitor 78, where the capacitor 78 is used to remove power supply noise from, i.e., stabilize, the internal control signal 46. Those skilled in the art will appreciate that, in some embodiments, the resistors 63 and 71 may be implemented using n-well resistors. Transistors 58, 64, and 70 are dependent on Vdd 48, whereas bipolar transistors 60, 66, and 72 are dependent on transistors 58, 64, and 70. Each of the transistors 58, 64, and 70 functions as a branch current source that drives a current.

Because transistors 58, 64, and 70 may be equal in size, they drive branch source currents that are substantially equal in value. Each bipolar transistor 60, 66, and 72 has a base-emitter voltage, $V_{BE}$, dependent on the size of its emitter area. $V_{BE}$ may be calculated using Equation (1):

$$V_{BE} = \frac{kT}{q}\ln\left(\frac{I_c}{I_s}\right), \qquad (1)$$

where k and q represent physical constants, T represents temperature, $I_C$ represents the current through the bipolar transistor's collector, and $I_S$ represents the saturation current of the bipolar transistor.

Together, the first branch 56 and the second branch 62 form a $\Delta V_{BE}$ current source. The $\Delta V_{BE}$ current source is based on the differential voltage between transistor 60 and transistor 66 with emitter area factors differing by a ratio of x. Accordingly, the value of $\Delta V_{BE}$ may be approximated using Equation (2):

$$\Delta V_{BE} = \frac{kT}{q}\ln(x(1+\varepsilon)), \qquad (2)$$

where k and q represent physical constants, T represents temperature, x represents a ratio of the emitter areas of bipolar transistors 60 and 66, and 1+ε represents the ratio of the currents of the first branch 56 and the second branch 62. As shown by Equation (2), $\Delta V_{BE}$ (also referred to as "differential $V_{BE}$ voltage") is dependent on ratio x. The operational amplifier 44 is used to provide feedback via the internal control signal 46 to the $\Delta V_{BE}$ current source, thereby counteracting process variations and channel-length modulation. In some embodiments of the present invention, the emitter areas of the bipolar transistors 60 and 66 may differ in size by a factor of 10, i.e., the emitter area of bipolar transistor 60 is 10 times larger than the emitter area of bipolar transistor 66.

The first branch voltage 59 is equal to the $V_{BE}$ of bipolar transistor 60, and the second branch voltage 65 is equal to the $V_{BE}$ of bipolar transistor 66 plus the voltage across resistor 63. Thus, the second branch voltage 65 may be determined using Equation (3):

$$BV_2 = V_{BE2} + I_2 R_2, \qquad (3)$$

where $BV_2$ represents the second branch voltage 65, $VB_{E2}$ represents the $V_{BE}$ of bipolar transistor 66, $I_2$ represents the current through resistor 63, and $R_2$ represents the value of resistor 63. Because $R_2$ is constant, using the operational amplifier 44 to equalize the difference in voltage between the first branch voltage 59 and the second branch voltage 65 allows an exact value to be determined for $I_2$.

The third branch 68 uses the $\Delta V_{BE}$ current source formed by the first and second branches 56 and 62 to generate two outputs: the temperature-independent voltage Vtemp_ind 74 and the temperature-dependent voltage Vtemp_dep 76. The value of the temperature-independent voltage Vtemp_ind 74 is equal to the sum of the temperature-dependent voltage Vtemp_dep 76 and the voltage across resistor 71. Transistor 70 is substantially equal in size to transistor 64. As a result, the current though transistor 70 is substantially equal to the current through transistor 64 (a technique or effect known as a "current mirror"). In addition, because the temperature-independent voltage Vtemp_ind 74 and the temperature-dependent voltage Vtemp_dep 76 are outputted from the same branch, power supply variations are equally coupled to both voltages Vtemp_ind 74 and Vtemp_dep 76, thereby allowing for supply variation cancellation.

One may show that the temperature-independent voltage Vtemp_ind 74 is a stable voltage using Equation (4):

$$Vtemp\_ind = V_{BE3} + \frac{nxR_1}{mxR_2} \times \frac{kT}{q}\ln x, \quad (4)$$

where k, T, q, and x have the same representations as in Equation (2), n and m represents constants, $V_{BE3}$ represents the $V_{BE}$ of transistor 72, $R_1$ represents the value of resistor 63, and $R_2$ represents the value of resistor 71. As seen from Equation (4), the determination of Vtemp_ind 74 involves the essential cancellation of a negative temperature coefficient and a positive temperature coefficient. Further, if $R_1$ and $R_2$ are substantially equal, they cancel each other out in Equation (4), thereby having no effective effect on Vtemp_ind 74.

As shown in FIG. 2, an adjustment circuit 80 is operatively connected to the internal control signal 46. A detailed discussion of the adjustment circuit 80 is given below with reference to FIG. 5. The adjustment circuit 80 outputs an adjustment control voltage Vadj 82 that is wire-OR connected to the internal control signal 46. By adjusting the internal control signal 46 via adjusting the adjustment control voltage 82, an operating characteristic, e.g., bandgap, of the temperature sensor 30 may be modified to desirably vary/control the generation of the temperature-independent voltage Vtemp_ind 74 and the temperature-dependent voltage Vtemp_dep 76.

As will be discussed below with reference to FIGS. 6 and 7, in some embodiments, one or more of the internal bias signals BIAS_1 50, BIAS_2 52, and BIAS_3 54 and/or the internal control signal 46 may be connected to a different number of adjustment circuits than the amounts shown in FIG. 2.

Referring to FIG. 2, a test processor unit 86 controls the adjustment circuit 80 using k control signals 84. The values of the k control signals 84 are determined by the test processor unit 86. The test processor unit 86 may communicate through a host interface (not shown) using m communication lines 88. Those with ordinary skill in the art will appreciate that the host interface and m communication lines 88 may take a wide variety of forms. For example, the communication may be defined by an industry standard such as JTAG (IEEE 1149).

The host interface (not shown) may be used to operatively connect to a separate computer system. For example, a tester 81 may communicate with the test processor unit 86. The tester 81 may control the test processor unit 86 to adjust adjustment circuit 80 to modify an operating characteristics of the temperature sensor 30. Moreover, the tester 81 may measure an operating characteristic of the temperature sensor 30 or a representative operating characteristic of an integrated circuit on which the temperature sensor 30 resides to determine the effect of the adjustment.

Those skilled in the art will understand that a variety of different adjustments may be made in an effort to identify the adjustment settings that produce the desired operating characteristics of the temperature sensor 30.

As shown in FIG. 2, a storage device 83 (discussed in detail below with reference to FIG. 4a) may be used to maintain control information representative of the adjustment settings (as discussed above) that produce desired operating characteristics of the temperature sensor 30. Using the tester 81, control information may be written into the storage device 83. The tester 81 may read or rewrite the control information in the storage device 83.

In one or more embodiments, the storage device 83 may include multiple storage elements such that the control information may be represented by a binary word. For example, the control information stored in the storage device 83 may be a binary word that corresponds to values of the k control signals 84. Alternatively, the control information may be a binary encoded word. For example, if the k control signals 84 uses eight control signals, the control information might be represented with a three bit binary word. Further still, the control information may contain instructions, interpreted by the test processor unit 86, to control the k control signals 84.

In one or more embodiments, the temperature sensor 30, or the integrated circuit on which the temperature sensor 30 resides, may be removed from the tester 81. In this case, the test processor unit 86, via n signal lines 85, may read the storage device 83 to obtain the control information and determine the amount of adjustment that should occur in adjustment circuit 80. Accordingly, the temperature sensor 30, after the test processor unit 86 reads the control information in the storage device 83 and adjusts the adjustment circuit 80, may have an operating characteristic similar to the operating characteristics obtained while connected to the tester 81.

Figure 3:
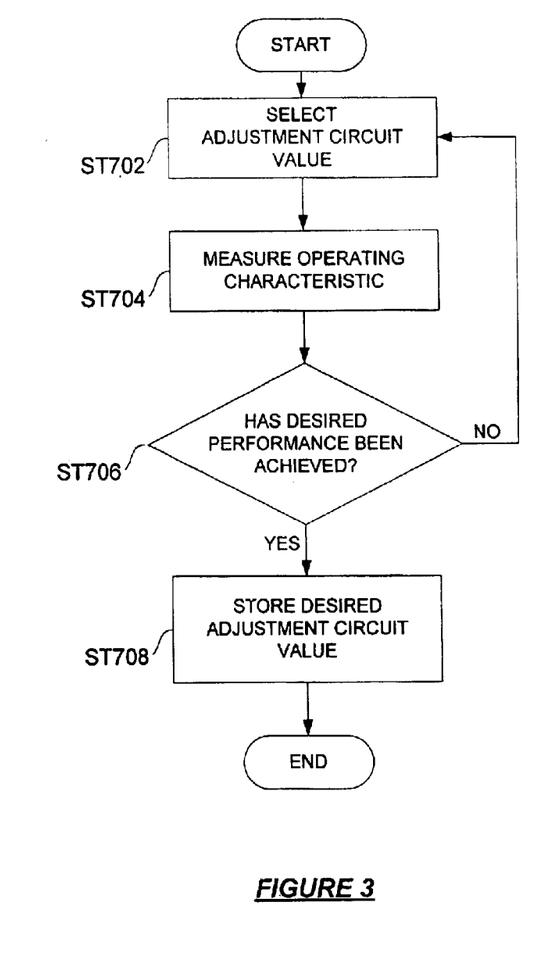
FIG. 3 shows a flow process in accordance with an embodiment of the present invention.

FIG. 3 shows a flow process in accordance with an embodiment of the present invention. In step 702, an adjustment circuit value is selected. The selected adjustment value is used to adjust one or more adjustment circuits. The adjustment of the adjustment circuit based on the selected adjustment value modifies an operating characteristic of the temperature sensor 30 (shown in FIG. 2). In step 704, the operating characteristics that ensue from an adjustment of the temperature sensor 30 based on the adjustment circuit value is measured.

In step 706, a determination is made as to whether a desired performance level is achieved. The determination may be based on an actual measurement taken with the selected adjustment circuit value, or an interpolation or extrapolation from data obtained from selectively adjusting the adjustment circuit value. If the desired performance level is not achieved, steps 702 and 704 are repeated until a desired adjustment circuit value and performance level is achieved. If the desired performance level is achieved, the corresponding adjustment circuit value, or a representation of the value, is stored in step 708. The desired adjustment circuit value, or representation of the value, is the control information stored in the storage device 83 (shown in FIG. 2). As discussed above, the storage device 83 can be used to store control information that may be accessed and used to improve the performance of the temperature sensor 30 after fabrication.

Figure 4A:
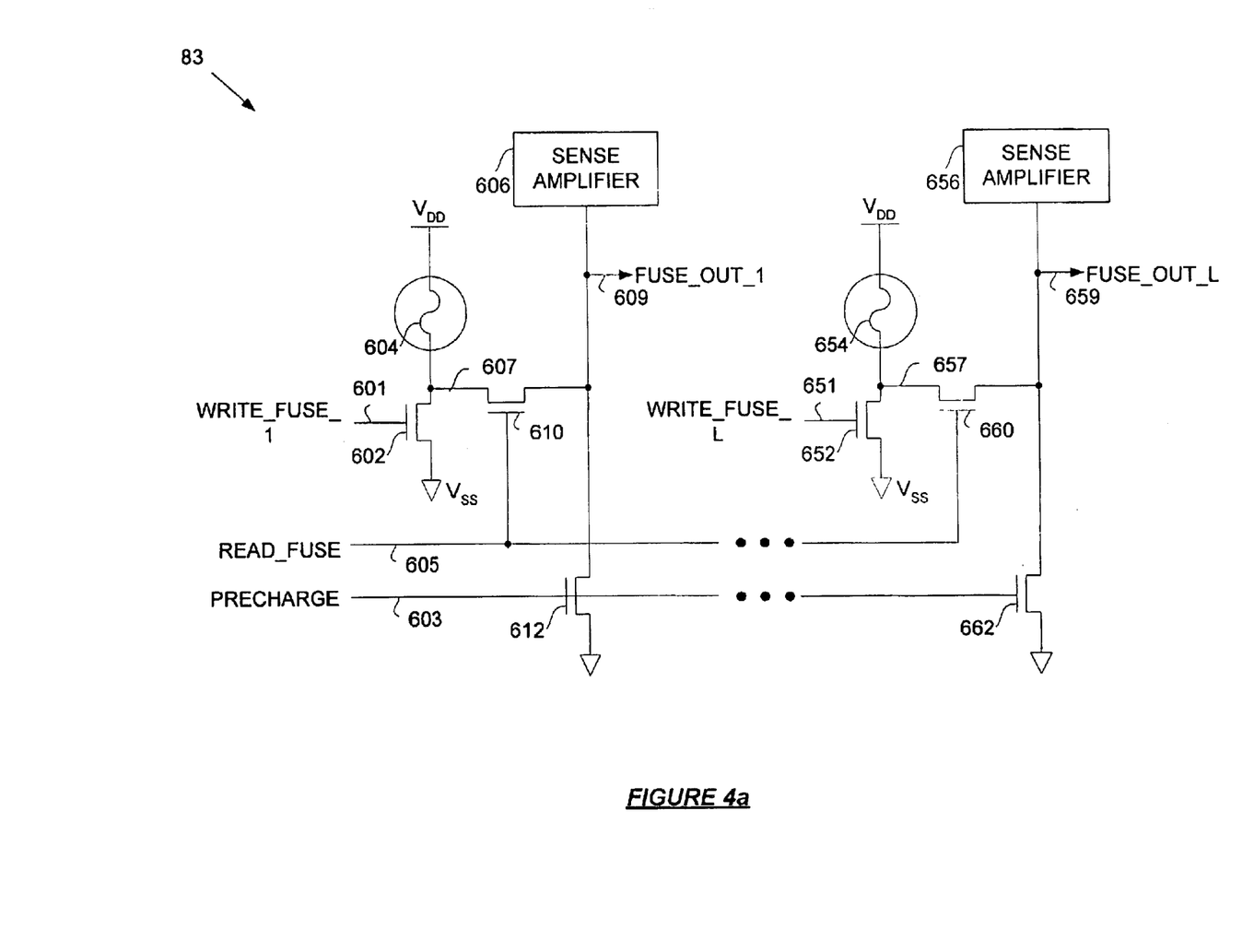
FIG. 4a shows a storage device in accordance with an embodiment of the present invention.

FIG. 4a shows an exemplary storage device 83 in accordance with an embodiment of the present invention. The storage device 83 includes electrically programmable fuses 604 and 654 to store nonvolatile control information. Multiple write signals, such as WRITE_FUSE_1 601 through WRITE_FUSE_L 651, are used to program electrically programmable fuses 604 and 654, respectively. A "high" voltage on WRITE_FUSE_1 601 and WRITE_FUSE_L 651 cause n-channel transistors 602 and 652, respectively, to turn "on." If n-channel transistors 602 and 652 are "on" for a sufficient duration, the fuse 604 and fuse 654, respectively, create an "open" circuit. A PRECHARGE signal 603 pulses "high" on the gates of n-channel transistors 612 and 662 to momentarily turn them "on." If n-channel transistors 612 and 662 are "on," FUSE_OUT_1 609 and FUSE_OUT_L 659 is pulled "low" by n-channel transistors 612 and 662. The "low" voltage on FUSE_OUT_1 609 and FUSE_OUT_L 659 precharge FUSE_OUT_1 609 and FUSE_OUT_L 659 in anticipation of a read operation.

A "high" voltage on READ_FUSE 605 causes n-channel transistors 610 and 660 to turn "on." If any of the fuses 604 and 654 are intact, i.e., shorted, FUSE_OUT_1 609 and FUSE_OUT_L 659 are respectively pulled "high." If any of the fuses 604 and 654 are open, FUSE_OUT_1 609 and FUSE_OUT_L 659 remain "low." The sense amplifiers 606 and 656 sense the voltage levels on FUSE_OUT_1 609 and FUSE_OUT_L 659, respectively, to amplify and maintain the voltage levels.

Figure 4B:
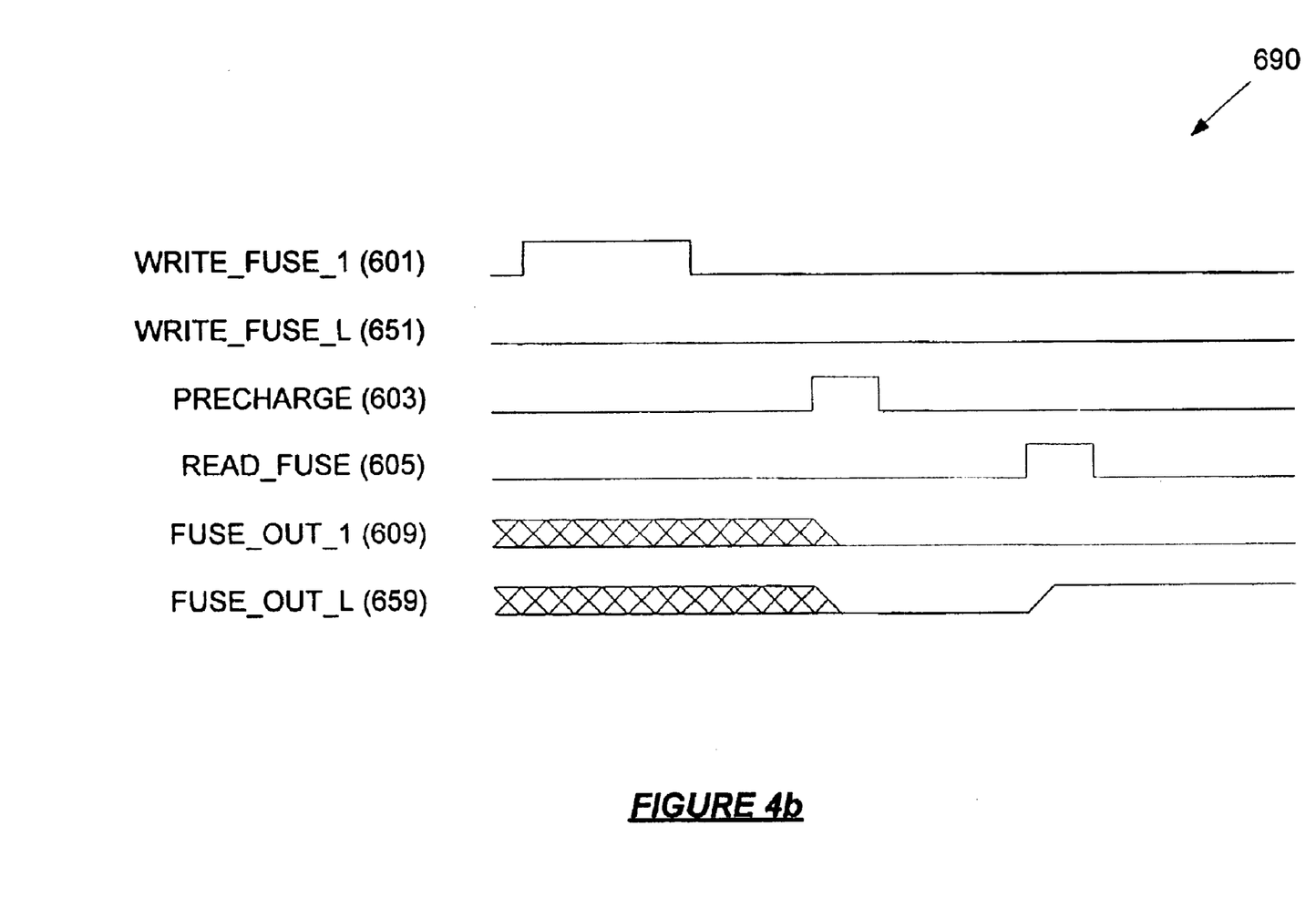

FIG. 4b shows a timing diagram 690 related to the programming of storage device 83 in accordance with an embodiment of the present invention. In this example, WRITE_FUSE_1 601 is pulsed to a "high" voltage to create an "open" on fuse 604. WRITE_FUSE_L 651 remains at a "low" voltage to leave fuse 604 intact. PRECHARGE 603 pulses "high" to pull FUSE_OUT_1 609 and FUSE_OUT_L 659 to a "low" voltage. READ_FUSE 605 pulses "high" to read the state of the fuses 604 and 654. Because fuse 604 is "open," FUSE_OUT_1 609 remains at a "low" voltage. Because fuse 654 is intact, or "shorted," FUSE_OUT_L 659 is pulled "high."

Because the fuses 604 and 654 have been programmed and read, FUSE_OUT_1 609 and FUSE_OUT_L 659 maintain the programmed control information. The state of the fuses 604 and 654 may be read at any time by observing the voltage level on FUSE_OUT_1 609 and FUSE_OUT_L 659. Also, the state of the fuses 604 and 654 may be read by repeating the precharge and read cycles. Using multiple fuses and related circuitry, a binary word may represent the stored control information.

One of ordinary skill in the art will appreciate that the electrically programmed fuses are but one method to store information. Those skilled in the art will appreciate that the storage device 83 may contain a wide variety of types of storage elements including, but not limited to, an electrically programmed fuse, an electrically programmed read only memory (EPROM), an electrically erasable read only memory, a one time programmable memory, a flash memory, a laser programmed fuse, and a laser programmed anti-fuse.

Figure 5:
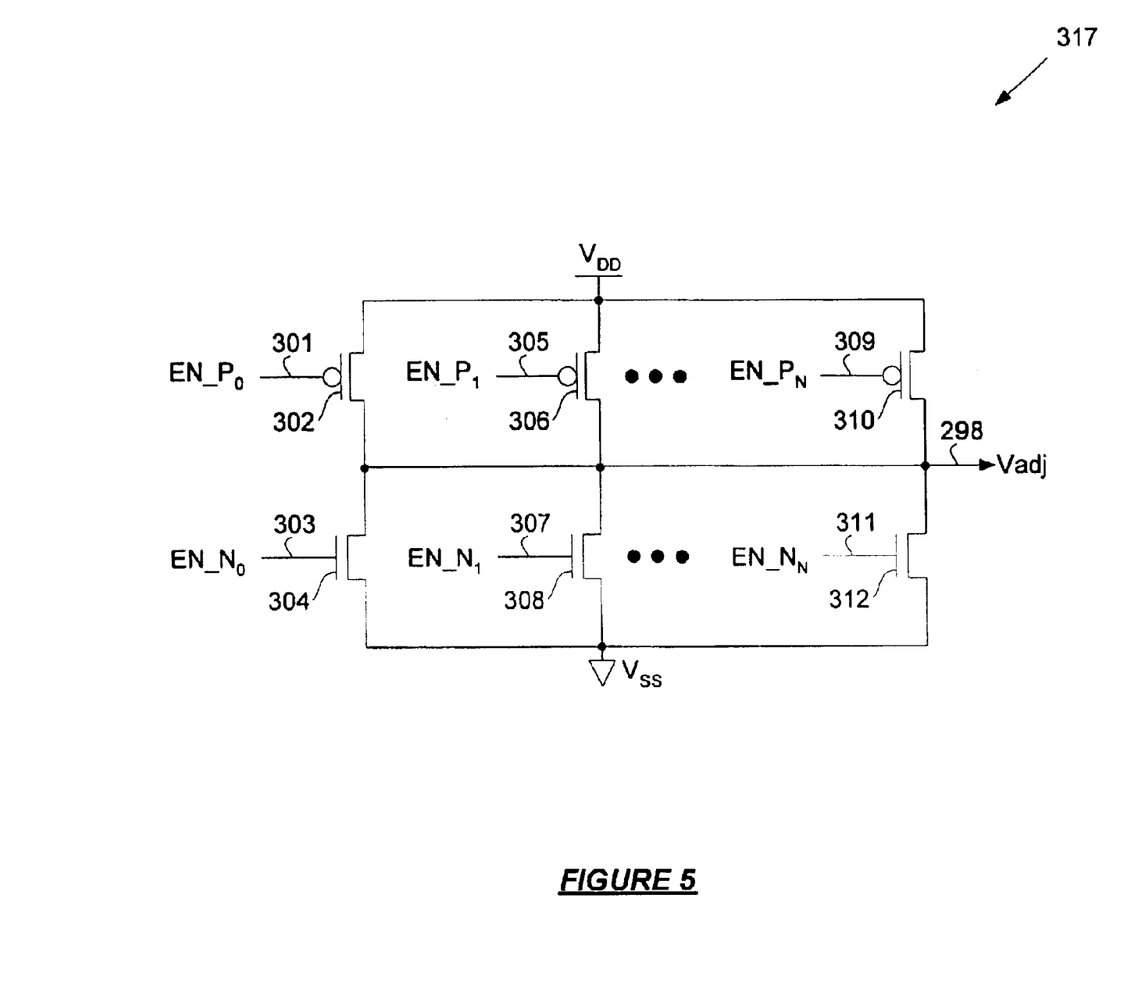
FIG. 5 shows an adjustment circuit in accordance with an embodiment of the present invention.

FIG. 5 shows an exemplary adjustment circuit 310 in accordance with an embodiment of the present invention. Those skilled in the art will understand that the adjustment circuit 310 shown in FIG. 5 is representative of the adjustment circuit 80 shown in FIG. 2.

In FIG. 5, the adjustment circuit 317 includes p-channel transistors 302, 306, and 310 arranged in parallel with each other. The p-channel transistors 302, 306, and 310 connect between a power supply, Vdd, and a common node, Vadj 298. Those skilled in the art will note that the common node Vadj 298 corresponds to Vadj 82 in FIG. 2. Still referring to FIG. 5, the adjustment circuit 317 also includes n-channel transistors 304, 308, and 312 arranged in parallel with each other. The n-channel transistors 304, 308, and 312 connect between ground, Vss, and the common node 298. The p-channel transistors 302, 306, and 310 are controlled by control signals EN_P$_0$ 301, EN_P$_1$ 305, and EN_P$_N$ 309, respectively. The n-channel transistors 304, 308, and 312 are controlled by control signals EN_N$_0$ 303, EN_N$_1$ 307, and EN_N$_N$ 311, respectively. A low voltage on any of the EN_P signals 301, 305, and 309 will turn 'on' their respective p-channel transistors 302, 306, and 310. A high voltage on any of the EN_N signals 303, 307, and 311 will turn 'on' their respective n-channel transistors 304, 308, and 312.

Any p-channel transistor 302, 306, and 310 that is 'on' will have a tendency to increase the voltage on Vadj 298 toward Vdd. Any n-channel transistor 304, 308, and 312 that is 'on' will have a tendency to lower the voltage on Vadj 298 toward Vss. By selecting which p-channel transistors 302, 306, and 310 and/or n-channel transistors 304, 308, and 312 are 'on,' a change in the voltage on Vadj 298 may be achieved.

Those with ordinary skill in the art will appreciate that the p-channel transistors 302, 306, and 310 and n-channel transistors 304, 308, and 312 may be turned 'on' individually or as a group. The p-channel transistors 302, 306, and 310 and n-channel transistors 304, 308, and 312 may be sized so that each transistor has a different effect compared to the other transistors, e.g., a transistor's gate width may be varied to adjust the strength of the transistor. The gate widths may be designed to provide a linear, exponential, or other function as more transistors are turned 'on.' The p-channel transistors 302, 306, and 310 and n-channel transistors 304, 308, and 312 may be sized so that each transistor has an inherently resistive nature, e.g., a transistor's gate length may be increased ('long-channel' transistors) to increase the inherent resistance of the transistor. A larger inherent resistance may be advantageous if both a p-channel transistor and a n-channel transistor are 'on' simultaneously. Those skilled in the art will appreciate that in other embodiments, the adjustment circuit 317 may include only one p-channel transistor and one n-channel transistor connected in series.

The k control signals 84 in FIG. 2 may represent EN_N signals 303, 307, and 311 in FIG. 5 and EN_P signals 301, 305, and 309 in FIG. 5. In other words, the k control signals 84 in FIG. 2 are used to turn 'on' or 'off' the p-channel transistors 302, 306, and 310 in FIG. 5 and n-channel transistors 304, 308, and 312 in FIG. 5.

Figure 6:
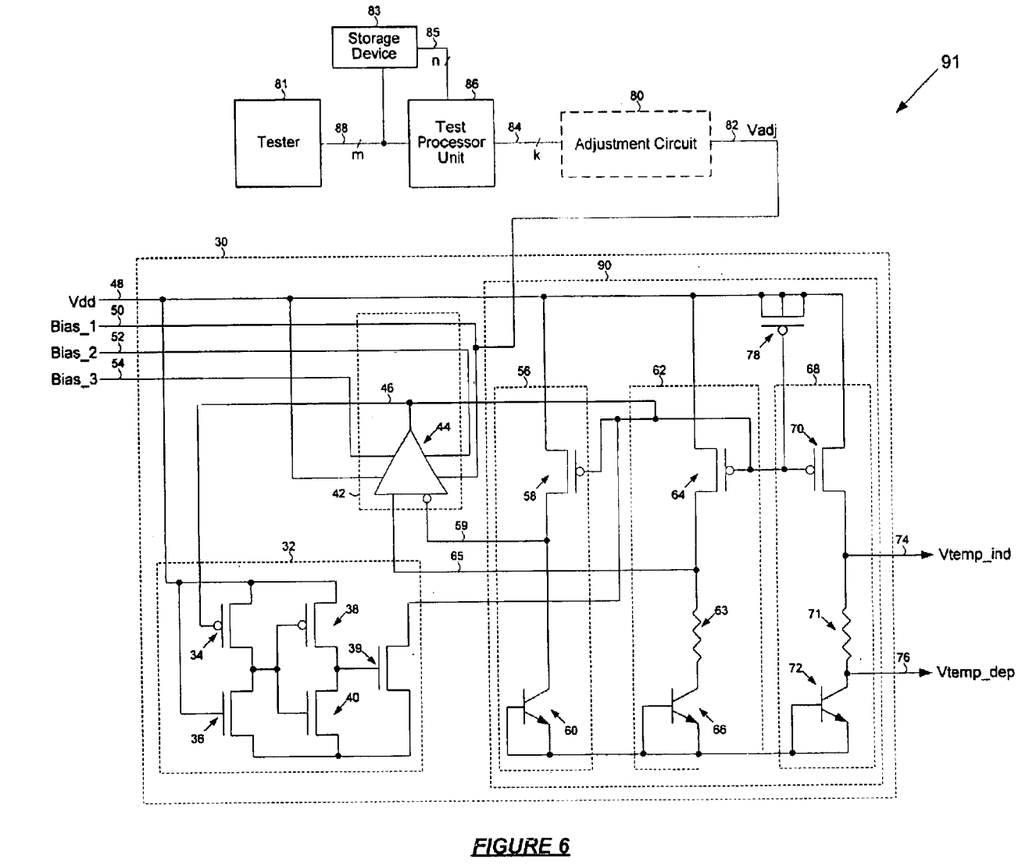
FIG. 6 shows an on-chip temperature sensor adjustment and calibration system in accordance with an embodiment of the present invention.

FIG. 6 shows the temperature sensor 30 and adjustment circuit 80 of FIG. 2 in accordance with another exemplary embodiment of the present invention. In FIG. 6, the adjustment control voltage Vadj 82 is operatively connected, e.g., wire-ORed, to internal bias signal BIAS_1 50. Accordingly, by adjusting the internal bias signal BIAS_1 50 via adjusting the adjustment control voltage Vadj 82, a behavior of the operational amplifier 44 is modified, thereby adjusting the internal control signal 46, which is operatively connected to an output of the operational amplifier 44.

Figure 7:
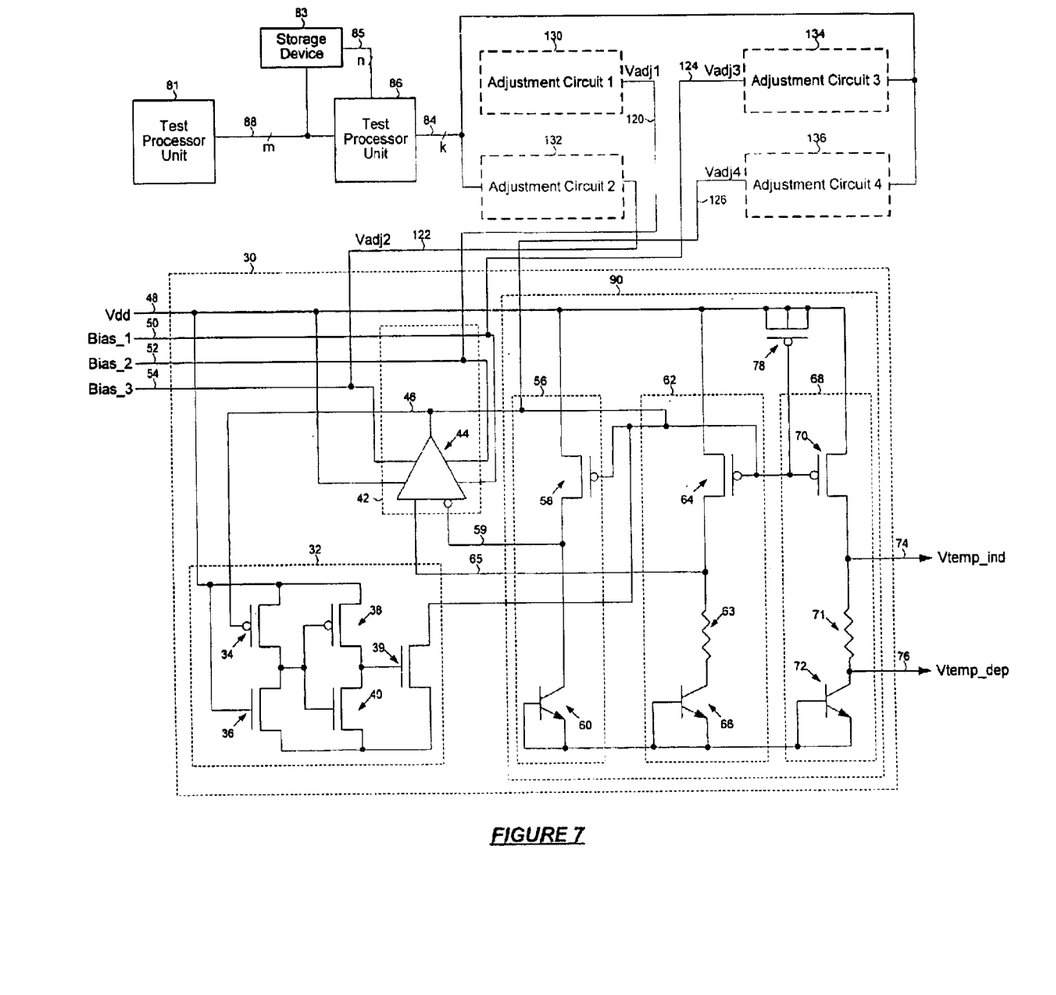
FIG. 7 shows an on-chip temperature sensor adjustment and calibration system in accordance with an embodiment of the present invention.

FIG. 7 shows the temperature sensor 30 and adjustment circuits 130, 132, 134, and 136 in accordance with another exemplary embodiment of the present invention. In FIG. 4, adjustment control voltages Vadj1 120, Vadj2 122, Vadj3 124, and Vadj4 126, generated by adjustment circuits 130, 132, 134, and 136, respectively, are operatively connected to internal bias signals BIAS_2 52, BIAS_3 54, and BIAS_1 50, and internal control signal 46, respectively. Accordingly, by adjusting the internal bias signals BIAS_1 50, BIAS_2 52, and BIAS_3 54 and internal control signal 46 via adjusting adjustment control voltages Vadj1 120, Vadj2 122, Vadj3 124, and Vadj4 126, a behavior of the operational amplifier 44 and internal control signal 46 is modified, thereby ultimately adjusting the internal control signal 46 to which the generation of the temperature-independent voltage Vtemp_ind 74 and the temperature-dependent voltage Vtemp_dep 76 is responsive.

Those skilled in the art will understand that, in FIG. 7, the storage device 83 may be used to store control information for one or more adjustment circuits. In other embodiments, a plurality of storage devices may be used to store control information for one or more adjustment circuits.

Advantages of the present invention may include one or more of the following. In one or more embodiments, because an adjustment circuit is operatively connected to a temperature sensor adapted to generate a temperature-independent voltage and a temperature-dependent voltage, an operating characteristic of the temperature sensor may be adjusted in order to achieve a desired performance level.

An on-chip temperature sensor, in a post-fabrication stage, i.e., after fabrication, may demonstrate operating characteristics that may not have been apparent from simulation. In one or more embodiments, because one or more adjustment circuits may be used to modify the operating characteristics of the on-chip temperature sensor, the temperature sensor may be calibrated.

In one or more embodiments, because a temperature sensor may be fabricated with a means for adjusting an output of the temperature sensor, fewer design iterations and higher confidence in temperature sensor operating characteristics may be afforded.

In one or more embodiments, a tester and a test processor unit may communicate so that the state of a temperature sensor may be obtained, performance characteristics analyzed, and/or adjustments made to the temperature sensor. By using the tester, control information may be stored in a storage device.

In one or more embodiments, a tester may take a relatively long to determine the desired value and program control information. Because the control information is programmed, a temperature sensor and the integrated circuit on which it resides may quickly adjust the temperature sensor to obtain proper operation.

In one or more embodiments, a limited number of temperature sensors may need to be tested to determine the desired value for the control information for a larger number of temperature sensors.

In one or more embodiments, because a control signal of a temperature sensor adapted to generate a temperature-independent voltage and a temperature-dependent voltage is operatively connected to an adjustment circuit, an operating characteristic of the temperature sensor is adjustable after the temperature sensor has been fabricated, thereby saving expensive monetary and temporal costs that would otherwise be necessary if the temperature sensor had to be redesigned or physically repaired.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An integrated circuit, comprising:
   a power supply;
   a temperature sensor operatively connected to the power supply, the temperature sensor comprising:
      an amplifier stage arranged to output an internal control signal,
      a startup stage operatively connected to the amplifier stage, wherein the startup stage is arranged to selectively control the internal control signal, and
      an output stage arranged to output a temperature-independent voltage and a temperature-dependent voltage dependent on the internal control signal;
   an adjustment circuit of which an output is operatively connected to the amplifier stage, wherein the internal control signal is responsive to the adjustment circuit; and
   a storage device arranged to store a control information, wherein the adjustment circuit is selectively responsive to the control information, and
   wherein the adjustment circuit is controllable independent of a connection to any one of the temperature-independent voltage and the temperature-dependent voltage.

2. The integrated circuit of claim 1, wherein the control information is determined based on a state of the adjustment circuit.

3. An integrated circuit, comprising:
   a power supply;
   a temperature sensor operatively connected to the power supply, the temperature sensor comprising:
      an amplifier state arranged to output an internal control signal,
      a startup state operatively connected to the amplifier stage, wherein the startup stage is arranged to selectively control the internal control signal, and
      an output stage arranged to output a temperature-independent voltage and a temperature-dependent voltage dependent on the internal control signal;
   an adjustment circuit of which an output is operatively connected to the amplifier stage, wherein the internal control signal is responsive to the adjustment circuit;
   a storage device arranged to store a control information, wherein the adjustment circuit is selectively responsive to the control information; and
   a tester operatively connected to the storage device, wherein the tester is arranged to selectively at least one of write and read at least a portion of the control information to the storage device.

4. The integrated circuit of claim 3, further comprising:
   a test processor unit operatively connected to the storage device and the adjustment circuit, wherein the tester is arranged to communicate with the test processor unit.

5. The integrated circuit of claim 4, wherein the test processor unit, dependent on the tester, is arranged to selectively read at least a portion of the control information from the storage device in order to selectively adjust the adjustment circuit.

6. The integrated circuit of claim 4, wherein the test processor unit, dependent on the tester, is arranged to selectively write at least a portion of the control information to the storage device.

7. The integrated circuit of claim 1, the storage device comprising at least one storage element, the storage element being at least one selected from the group consisting of an electrically programmable fuse, an electrically programmable read only memory, an electrically erasable read only memory, a one-time programmable memory, a flash memory, a laser programmable fuse, and a laser programmable anti-fuse.

8. The integrated circuit of claim 1, the control information comprising a binary word.

9. The integrated circuit of claim 1, the control information comprising an instruction.

10. An integrated circuit, comprising:
    a power supply;
    a temperature sensor operatively connected to the power supply, the temperature sensor comprising:
       an amplifier stare arranged to output an internal control signal,
       a startup stage operatively connected to the amplifier stage, wherein the startup stage is arranged to selectively control the internal control signal, and
       an output state arranged to output a temperature independent voltage and a temperature-dependent voltage dependent on the internal control signal;
    an adjustment circuit of which an output is operatively connected to the amplifier stage, wherein the internal control signal is responsive to the adjustment circuit, the adjustment circuit comprising:

a first device arranged to selectively control current flow between a power supply and the output of the adjustment circuit; and a second device arranged to selectively control current flow between the output of the adjustment circuit and ground; and a storage device arranged to store a control information, wherein the adjustment circuit is selectively responsive to the control information.

11. The integrated circuit of claim 10, wherein the first device is a p-channel transistor and the second device is an n-channel transistor, and wherein the p-channel transistor and the n-channel transistor are arranged in series.

12. The integrated circuit of claim 10, the adjustment circuit comprising a third device arranged in parallel with the first device.

13. The integrated circuit of claim 10, the adjustment circuit comprising a third device arranged in parallel with the second device.

14. An integrated circuit, comprising:

amplifier means for generating an internal control signal for a temperature sensor;

first generating means for generating a temperature-dependent voltage dependent on the internal control signal;

second generating, means for generating a temperature-independent voltage dependent on the internal signal;

adjusting means for adjusting the internal control signal, the adjusting means being operatively connected to the amplifier means, wherein the adjusting means is controllable independent of a connection to any one of the temperature-independent voltage and the temperature-dependent voltage; and storing means for storing a control information, wherein the adjusting means is selectively responsive to the control information.

15. A method for post-fabrication treatment of an on-chip temperature sensor, comprising:

generating an internal control signal using an amplifier stage;

generating a temperature-independent voltage depending on the internal control signal;

generating a temperature-dependent voltage depending on the internal control signal;

selectively adjusting the internal control signal using an adjustment circuit of which an output is operatively connected to the amplifier stage, wherein the adjustment circuit is controllable independent of a connection to any one of the temperature-independent voltage and the temperature-dependent voltage; and storing at least a portion of a control information determined from the selectively adjusting in a storage device, the at least a portion of the control information to which the adjustment circuit is selectively responsive.

16. The method of claim 15, wherein the at least a portion of the control information is determined based on a state of the adjustment circuit.

17. The method of claim 15, the storing device comprising a storage element, wherein the storage element is at least one selected from the group consisting of an electrically programmable fuse, an electrically programmable read only memory, an electrically erasable read only memory, a one-time programmable memory, a flash memory, a laser programmable fuse, and a laser programmable anti-fuse.

18. A method for post-fabrication treatment of an on-chip temperature sensor, comprising:

generating an internal control signal using an amplifier stage;

generating a temperature-independent voltage depending on the internal control signal;

generating a temperature-dependent voltage depending on the internal control signal;

selectively adjusting the internal control signal using an adjustment circuit of which an output is operatively connected to the amplifier stage, the selectively adjusting comprising:

controlling a first current flow between a power supply and the output of the adjustment circuit; and controlling a second current flow between the output of the adjustment circuit and ground; and storing at least a portion of a control information determined from the selectively adjusting in a storage device, the at least a portion of the control information to which the adjustment circuit is selectively responsive.

* * * * *